United States Patent
González Gonzalbo et al.

(10) Patent No.: US 9,567,067 B2
(45) Date of Patent: Feb. 14, 2017

(54) AIRCRAFT WITH A NACELLE-HOUSED MAIN LANDING GEAR

(71) Applicant: AIRBUS OPERATIONS, S.L., Getafe (ES)

(72) Inventors: Alfonso González Gonzalbo, Getafe (ES); José María Díaz Parrila, Getafe (ES)

(73) Assignee: Airbus Operations S.L., Getafe (ES)

( * ) Notice: Subject to any disclaimer, the term of this patent is extended or adjusted under 35 U.S.C. 154(b) by 21 days.

(21) Appl. No.: 14/625,776

(22) Filed: Feb. 19, 2015

(65) Prior Publication Data
US 2016/0046365 A1 Feb. 18, 2016

(30) Foreign Application Priority Data

Feb. 27, 2014 (EP) ..................................... 14382071

(51) Int. Cl.
*B64C 25/14* (2006.01)
*B64C 7/02* (2006.01)
*B64C 3/18* (2006.01)
*B64C 25/34* (2006.01)
*B64D 27/18* (2006.01)

(52) U.S. Cl.
CPC ............... *B64C 25/14* (2013.01); *B64C 3/185* (2013.01); *B64C 7/02* (2013.01); *B64C 25/34* (2013.01); *B64D 27/18* (2013.01)

(58) Field of Classification Search
CPC ............ B64C 25/14; B64C 7/02; B64D 27/18
See application file for complete search history.

(56) References Cited

U.S. PATENT DOCUMENTS

| 2,049,066 A * | 7/1936 | Kindelberger | .......... B64C 25/14 244/102 R |
| 2,446,415 A * | 8/1948 | Flurscheim | ............. B64C 25/14 244/102 R |
| 2,690,887 A | 10/1954 | Perdue | |
| 3,900,178 A | 8/1975 | Tupolev et al. | |
| 6,651,928 B1 * | 11/2003 | Stuhr | ........................ B64C 3/32 244/102 R |
| 6,705,567 B2 * | 3/2004 | Dong | ..................... B64C 30/00 244/117 R |

FOREIGN PATENT DOCUMENTS

DE  11 09 533  6/1961

OTHER PUBLICATIONS

Search Report for EP 14382071.0, dated Sep. 5, 2014, 7 pages.

* cited by examiner

*Primary Examiner* — Brian M O'Hara
(74) *Attorney, Agent, or Firm* — Nixon & Vanderhye P.C.

(57) ABSTRACT

A main landing gear for aircraft having a fuselage, a wing and a jet engine on opposite sides of the fuselage and housed in a nacelle attached to the wing. The main landing gear includes a landing gear at each side of the wing having wheels coupled to a driving device that moves the wheels between stowed and deployed positions. The engine nacelles each include a well located laterally with respect to the jet engines and configured as a housing space for stowing the wheels of the landing gears.

19 Claims, 2 Drawing Sheets

AIRCRAFT WITH A NACELLE-HOUSED MAIN LANDING GEAR

RELATED APPLICATION

This application claims priority to and incorporates by reference European Patent Application No. 14382071.0 filed on Feb. 27, 2014

FIELD OF THE INVENTION

This invention relates to commercial aircraft and more particularly to aircraft having a wing-mounted main landing gear (MLG).

BACKGROUND OF THE INVENTION

Most turbofan-powered commercial aircraft favor body or wing-mounted main landing gear arrangements. In both cases, the choice implies the provision of a wheel well large enough to fit the wheels and a driving device comprising a strut joined to the wheels and ancillary elements for moving the wheels from the deployed position to the stowed position and vice versa.

In the former case, the installation of an aerodynamic fairing that covers the MLG in its stowed position may be required in order to minimize drag.

In the latter, the wheel well compromises the sizing and manufacturing of the wing torsion box. In the early stages of commercial jet development, this situation was palliated by the introduction of the "Yehudi", a kink in the wing planform trailing edge that increases the wing root chord and hence, the available volume for MLG stowage.

Regardless of where the MLG is mounted, the wheel well is commonly covered and sealed in cruise by the landing gear doors. These doors may or may not entirely cover the MLG from the flow, e.g. B737, but have an impact on the wing/fuselage skin and on the airframe noise during approach and landing configurations.

Common to both scenarios is the complex kinematics needed to achieve efficient movement of the wheel bogie/truck. Needless to say, these elements undergo high loads during landing, taxi and static conditions, which make said components large and heavy.

Therefore a reduction of the weight and complexity of the MLG attachment is highly sought after by the aeronautic industry.

This invention is addressed to the attention of that demand.

SUMMARY OF THE INVENTION

The invention refers to a MLG arrangement for aircraft comprising a fuselage, a wing and at least one jet engine at each side of the wing housed in a nacelle attached to the wing.

The MLG comprises a landing gear at each side of the wing having one or more wheels coupled to a driving device arranged for moving them from a stowed position to a deployed position and vice versa. The engine nacelles include wells located laterally with respect to the jet engines and configured as a housing space of the one or more wheels of each landing gear in its stowed position. Each driving device comprises a strut attached by one end to the load-bearing structure of the wing in a rotatory manner and by the other end to the one or more wheels.

Each landing gear may be configured with a single wheel or with a wheel truck including two or more wheels and the MLG may be configured with one or two landing gears at each side of the wing.

Advantageously the jet engines are turbofan engines. The large diameter of their nacelles, particularly in turbofan engines having a bypass ratio greater than 10, facilitates the housing of the wheels of the landing gears inside them.

Advantageously the driving device of each landing gear is arranged for moving the one or more wheels in a direction parallel to the X-Z plane of the aircraft.

In a first embodiment for an aircraft where the load-bearing structure of each side of the wing is a torsion box, the driving device of each landing gear comprises a strut configured with a fixed length and a first guiding element of fixed length having one end attached to the rear spar of the torsion box and the other end attached to the strut in an sliding manner.

In a second embodiment, the driving device of each landing gear comprises a strut configured with a variable length and a second guiding element of variable length having one end attached to the nacelle and the other end fixedly attached to the strut.

Other characteristics and advantages of the present invention will be clear from the following detailed description of embodiments illustrative of its object in relation to the attached figures.

DETAILED DESCRIPTION OF THE INVENTION

Figure 1A:
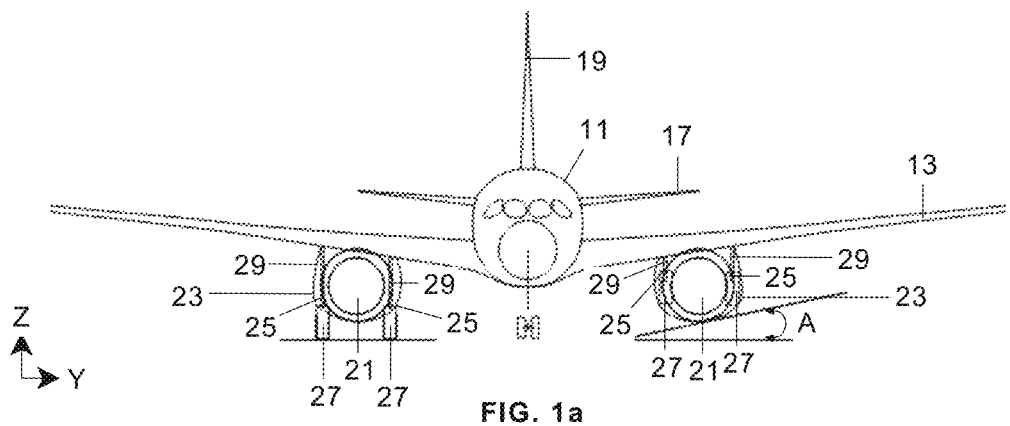
FIGS. 1a and 1b are frontal views of an aircraft with a nacelle-housed MLG illustrating two embodiments of the invention.
Figure 1B:
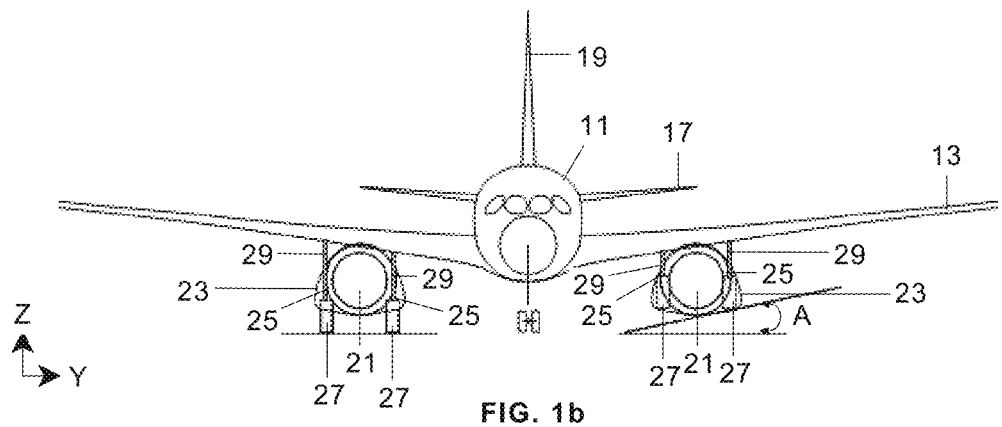

In reference to a commercial aircraft of a typical configuration comprising, as shown in FIGS. 1a and 1b, a fuselage 11, a wing 13, a horizontal tail plane 17, a vertical tail plane 19 and two wing-mounted jet engines 21 housed in nacelles 23, the basic feature of the invention is that the MLG is arranged with the wheels 27 housed in wells located in the sides of the aft section of the nacelles 23 when they are in their stowed positions.

For a better illustration the wheels 27 of the MLG are shown in FIGS. 1a and 1b in their deployed position in the left side and in their stowed position in the right side.

In the embodiment shown in FIG. 1a the wheel wells are located at both sides of the jet engines 21, in a vertically centered position with respect to them and the nacelles 23 have an oval aerodynamic shape enclosing the wheel wells.

In the embodiment shown in FIG. 1b the wheel wells are located at both sides of the jet engines 21 in a low position with respect to them and the nacelles 23 have a bulged oval aerodynamic shape enclosing the wheel wells.

In both cases the nacelles 23 includes a door (not shown) to be opened when the wheels 27 are deployed and to be closed when they are stowed.

In the embodiments shown in FIGS. 1a and 1b, the MLG comprises four single landing gears 25 each of them comprising a wheel 27 and a driving device 29.

In other embodiments (not shown) the MLG comprises two single landing gears 25 arranged in the lateral side of the nacelles 23 closer to the fuselage 11.

In similar embodiments to the aforementioned, the single wheel 27 can be substituted by a truck wheel.

Figure 2:
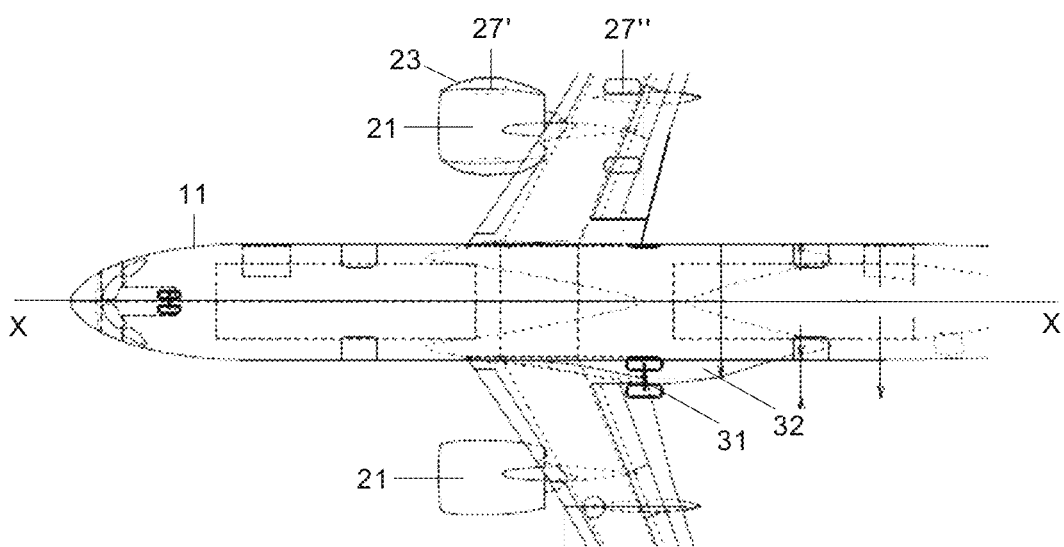
FIG. 2 is a plan view of an aircraft having in its left side (assuming that the reference axis is the flight direction) a conventional MLG and in its right side a MLG according to the invention for comparative purposes.

The different arrangement of the MLG of the invention with respect to a conventional MLG arrangement is illustrated in FIG. 2. In the former the wheels (referenced with the number 27') are stowed in the engine nacelle 23 while in the latter they are stowed in a ventral fairing 32. In the former the wheels (referenced with the number 27") are deployed at a position not so close to the fuselage 11 as the deployed position of the wheels 31 of the latter.

Figure 3A:
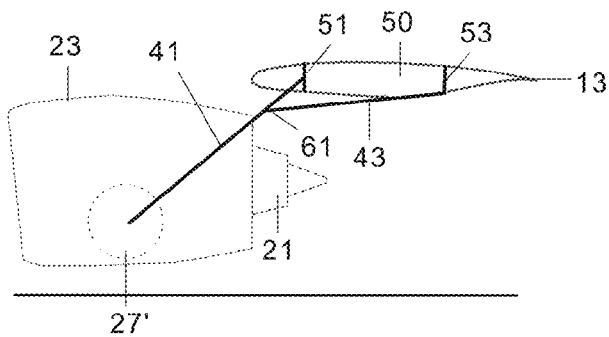
FIGS. 3a and 3b are schematic side views of the arrangement of a nacelle-housed MLG in an aircraft illustrating a first embodiment of the MLG kinematics.
Figure 3B:
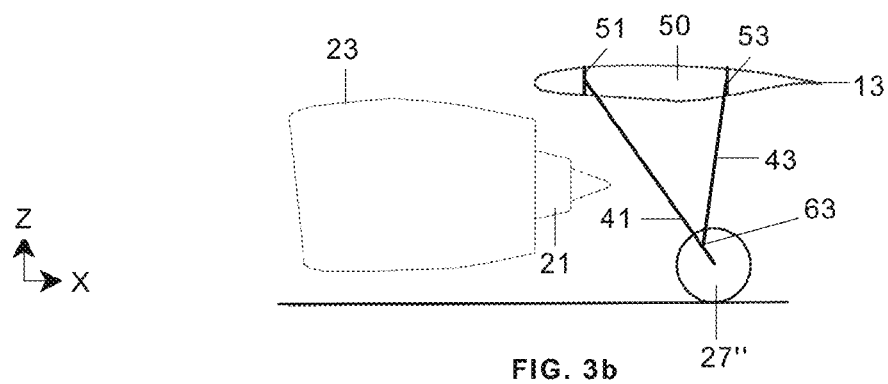

FIGS. 3a and 3b show the arrangement of an embodiment of a single landing gear 25 comprising a wheel (referenced with the number 27' in the stowed position and with the number 27" in the deployed position) and a driving device comprising a kinematic mechanism formed by a strut 41 and a first guiding element 43. FIG. 3a shows the strut 41 attached to the wheel 27' in the stowed position inside the nacelle 23. FIG. 3b shows the strut 41 attached to the wheel 27" in the deployed position on the ground. The strut 41, having a fixed length, is attached by one end to the forward spar 51 of the torsion box 50 (the load bearing structure of the wing 13) in a rotatory manner and by the other end to the wheel. The first guiding element 43, also having a fixed length, is attached by one end to the rear spar 53 of the torsion box 50 and by the other end to the strut 41 in a sliding manner so that it can be displaced from the point 61 to the point 63 of the strut 41 during a deploying operation of the wheel or vice versa in a stowing operation.

Figure 4A:
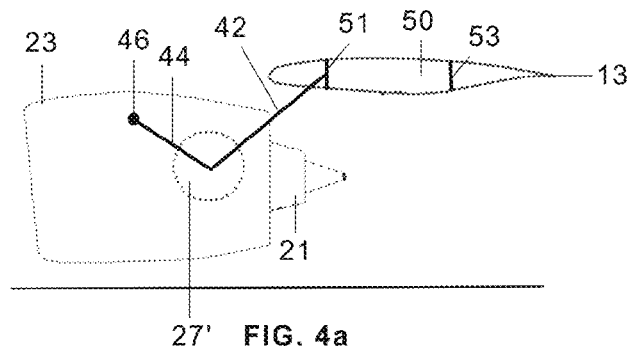
FIGS. 4a and 4b are schematic side views of the arrangement of a nacelle-housed MLG in an aircraft illustrating a second embodiment of the MLG kinematics.
Figure 4B:
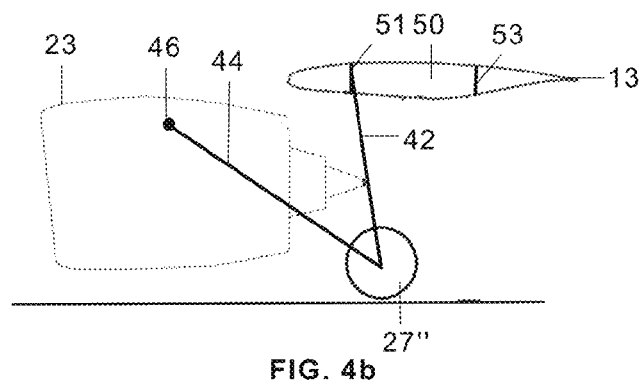

FIGS. 4a and 4b show the arrangement of another embodiment of a single landing gear 25 comprising a wheel—referenced with the number 27' in the stowed position and with the number 27" in the deployed position—and a driving device including a kinematic mechanism formed by a strut 42 and a second guiding element 44. FIG. 4a shows the strut 42 attached to the wheel 27' in the stowed position inside the nacelle 23. FIG. 3b shows the strut 42 attached to the wheel 27" in the deployed position on the ground. The strut 42, having a variable length (by means of, for example, a telescopic arrangement) is attached by one end to the forward spar 51 of the torsion box 50 (the load bearing structure of the wing 13) in a rotatory manner and by the other end to the wheel. The second guiding element 44, also having a variable length, is attached by one end to a fixed point 46 of the nacelle 23 and by the other end to the strut 42 to control its movement in a deploying/stowage operation of the wheel.

The kinematic mechanisms shown in FIGS. 3a-3b, 4a-4b assume that the displacement of the driving device takes place in a direction parallel to the X-Z plane of the aircraft (X and Z being, respectively the longitudinal and vertical axis) to avoid as much as possible interaction with the hot engine exhaust plume as well as to simplify the MLG architecture. More complex solutions, however, are possible with the introduction of skewed and out-of-pane rotation/retraction mechanisms.

The invention is particularly advantageous for aircraft provided with turbofans of high bypass ratio (BPR) which are increasingly used in the aeronautic industry to improve fuel consumption and reduce noise. This trend involves a significant increase of the fan diameter. For example, while the fan diameter of the turbofans of the A320 Neo is 81", very high bypass ratio (VHBPR) turbofans having fan diameters of up to 174" are envisaged for the near future.

The invention takes advantage of the large fan diameters of turbofans of high bypass ratio, particularly of turbofans of BPR greater than 10, to house the MLG wheels inside the turbofan nacelles. The wheel wells need a small volume in comparison with the engine volume so that the required modification of a typical turbofan nacelle to house a wheel well does not involve significant aerodynamic costs.

Aircraft of conventional configuration provided with the MLG of the invention allow the integration of turbofans of high bypass ratio because they can keep a conventional wing dihedral and suitable angle A (see FIGS. 1a-1b).

In addition, the invention has the following advantages.

Reduced MLG weight.

Drag reduction through removal of the belly fairing.

Shorter MLG stroke.

Improvement of wing-fuselage junction, including high-lift systems, because of the placement of the landing gears far from it.

Increased fuel tank volume because of the small interference of the MLG with the wing torsion box.

Relief of engine loads on the wing while on ground (landing & taxi) thanks to the position of the MLG.

Reduced fatigue of the wing structure because the landing manoeuvre will not have nacelles acting as cantilever-mass system as the main ground reaction will pass through them avoiding vibrations and heavy unsteady loads.

Integration of load entry points into hard points on the wing (combine engine and MLG).

Removal of tip-over criterion (improved X-wind performance) due to larger wheel track.

Enables negatively scarfed engine.

Enables over-the-wing engine location.

OEI ("One Engine Inoperative") event improved if engines are placed more inboard, limited by an UERF ("Uncontained Engine Rotor Failure") event.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

We claim:

1. An aircraft comprising:
    a fuselage,
    a wing,
    at least one jet engine on one side of the fuselage, the jet engine is housed in a nacelle attached to the wing, and
    a main landing gear;
    wherein the wing comprises a load-bearing structure extending in a span wise direction and the main landing gear comprises at least a landing gear at one side of the wing having one or more wheels coupled to a driving device arranged for moving the landing gear from a stowed position to a deployed position and vice versa, wherein the nacelle includes a well aligned with the jet engine such that the well and jet engine both intersect a line extending in a span wise direction of the wing and the well is configured as a housing space for the one or more wheels of the landing gear in its stowed position, and said driving device comprises a strut attached by one end to the load-bearing structure of the wing in a rotary manner and by the other end to the one or more wheels.

2. The aircraft according to claim 1, wherein the landing gear has one wheel.

3. The aircraft according to claim 1, wherein the landing gear comprises two or more wheels arranged in a wheel truck.

4. The aircraft according to claim 1 wherein said jet engine extends forward of the wing.

5. The aircraft according to claim 1 wherein the jet engine is a turbofan engine.

6. The aircraft according to claim 5, wherein the turbofan engine has a by-pass ratio greater than ten.

7. The aircraft according to claim 1, wherein the driving device is configured to move the one or more wheels in a direction parallel to an X-Z plane of the aircraft, wherein X is a longitudinal axis of the aircraft and Z is another axis perpendicular to the longitudinal axis.

8. The aircraft according to claim 1 wherein:
the load-bearing structure includes a torsion box comprising forward and rear spars, and
the strut is attached to the forward spar.

9. The aircraft according to claim 8, wherein the strut is configured with a fixed length and the driving device comprises a first guiding element of a fixed length having one end attached to the rear spar and another end slidably attached to the strut.

10. The aircraft according to claim 8, wherein the strut is configured with a variable length and the driving device comprises a second guiding element of a variable length having one end attached to the nacelle and another end fixedly attached to the strut.

11. The aircraft according to claim 1, wherein the well comprises two wells for housing the one or more wheels of the landing gear in its stowed position.

12. The aircraft according to claim 11, wherein the two wells are located at two sides of the jet engine respectively in a vertically centered position with respect to the jet engine.

13. The aircraft according to claim 11, wherein the two wells are located at two sides of the jet engine respectively in a low position with respect to the jet engine.

14. An aircraft comprising:
a fuselage;
a wing comprising a load bearing structure;
a main landing gear including a strut pivotably attached to the load bearing structure and supporting at least one wheel, wherein the strut pivots between a stowed position of the main landing gear and a deployed position of the main landing gear;
a nacelle attached to the wing and including a housing space configured to receive the at least one wheel while the main landing gear is in the stowed position, and the nacelle being configured to house a jet engine,
wherein the housing space of the nacelle is aligned with the jet engine along a line perpendicular to a longitudinal axis of the fuselage such that the jet engine and the housing space intersect the line.

15. The aircraft according to claim 14, wherein the strut is configured with a fixed length.

16. The aircraft according to claim 14, wherein the strut is configured with a variable length.

17. The aircraft according to claim 14, wherein the housing space is located at one side of the jet engine in a vertically centered position with respect to the jet engine.

18. The aircraft according to claim 14, wherein the housing space is located at one side of the jet engine in a low position with respect to the jet engine.

19. The aircraft according to claim 14, wherein the jet engine is a turbofan engine.

* * * * *